(12) United States Patent
Lewis

(10) Patent No.: US 9,644,966 B2
(45) Date of Patent: May 9, 2017

(54) INTEGRATED OPTIC CIRCUIT WITH WAVEGUIDES STITCHED AT SUPPLEMENTARY ANGLES FOR REDUCING COHERENT BACKSCATTER

(71) Applicant: Honeywell International Inc., Morristown, NJ (US)

(72) Inventor: Jeffrey Earl Lewis, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 316 days.

(21) Appl. No.: 14/484,102

(22) Filed: Sep. 11, 2014

(65) Prior Publication Data
US 2016/0076891 A1 Mar. 17, 2016

(51) Int. Cl.
| | |
|---|---|
| *G01C 19/72* | (2006.01) |
| *G02B 6/125* | (2006.01) |
| *G02B 6/134* | (2006.01) |
| *G01C 19/64* | (2006.01) |
| *G02F 1/01* | (2006.01) |
| *G02F 1/225* | (2006.01) |

(52) U.S. Cl.
CPC ........... *G01C 19/721* (2013.01); *G01C 19/64* (2013.01); *G02B 6/125* (2013.01); *G02B 6/1342* (2013.01); *G02F 1/0136* (2013.01); *G02F 1/225* (2013.01)

(58) Field of Classification Search
CPC ....... G01C 19/721; G01C 19/64; G02F 1/225; G02F 1/0136; G02B 6/125; G02B 6/1342
See application file for complete search history.

(56) References Cited

U.S. PATENT DOCUMENTS

| | | | |
|---|---|---|---|
| 5,875,276 A | * | 2/1999 | Mahapatra ............. G02B 6/126 29/25.35 |
| 6,160,927 A | | 12/2000 | Leclerc et al. |
| 6,957,007 B2 | | 10/2005 | Balch et al. |
| 7,146,081 B2 | | 12/2006 | Balch et al. |

(Continued)

FOREIGN PATENT DOCUMENTS

| | | |
|---|---|---|
| WO | 0175496 | 10/2001 |
| WO | 2004061507 | 7/2004 |

OTHER PUBLICATIONS

Kaminow, "Optical Integrated Circuits: A Personal Perspective", "Journal of Lightwave Technology", May 1, 2008, pp. 994-1004, vol. 26, No. 9, Publisher: IEEE.

(Continued)

*Primary Examiner* — Hwa Lee
(74) *Attorney, Agent, or Firm* — Fogg & Powers LLC

(57) ABSTRACT

An integrated optical circuit comprises a first waveguide section of a first material having a first index of refraction, a second waveguide section diffused with a second material, different from the first material, the second waveguide section having a second index of refraction; and a third waveguide section of the first material. A portion of the first waveguide section at a first interface is angled at a first angle and a portion of the second waveguide section is angled at the first angle. A portion of the first waveguide section at a second interface is angled at a second angle and a portion of the third waveguide section is angled at the second angle. The first angle and second angle are selected such that the angle of incidence of light at the first and second interfaces is greater than the Brewster's angle.

9 Claims, 5 Drawing Sheets

(56) References Cited

U.S. PATENT DOCUMENTS

| | | |
|---|---|---|
| 8,070,368 B1 | 12/2011 | Moody et al. |
| 8,373,863 B2 | 2/2013 | Feth |
| 8,447,152 B2 | 5/2013 | Lee et al. |
| 8,472,766 B2 | 6/2013 | Spector et al. |
| 8,639,073 B2 | 1/2014 | Pelletier et al. |
| 8,655,126 B2 | 2/2014 | Kondou et al. |
| 8,731,350 B1 | 5/2014 | Lin et al. |
| 8,744,225 B2 | 6/2014 | Yoshida |
| 2004/0017974 A1 | 1/2004 | Balch et al. |
| 2006/0002676 A1 | 1/2006 | Balch et al. |
| 2007/0223857 A1 | 9/2007 | Nunoya et al. |
| 2009/0219545 A1 | 9/2009 | Feth |
| 2010/0135610 A1 | 6/2010 | Feth |

OTHER PUBLICATIONS

European Patent Office, "Extended European Search Report from EP Application No. 15183981.8 mailed Feb. 10, 2016", "from Foreign Counterpart of U.S. Appl. No. 14/484,102", Feb. 10, 2016, pp. 1-8, Published in: EP.

* cited by examiner

INTEGRATED OPTIC CIRCUIT WITH WAVEGUIDES STITCHED AT SUPPLEMENTARY ANGLES FOR REDUCING COHERENT BACKSCATTER

BACKGROUND

A fiber optic gyroscope (FOG) uses the interference of light to measure angular velocity. Rotation is sensed in a FOG with a large coil of optical fiber forming a Sagnac interferometer. To measure rotation, two light beams are introduced into the coil in opposite directions by an electro-optic modulating device such as an integrated optical circuit (IOC). If the coil is undergoing a rotation, then the beam traveling in the direction of rotation will experience a longer path to the other end of the fiber than the beam traveling against the rotation. This is known as the Sagnac effect. As the beams exit the fiber they are combined in the IOC, and the phase shift between the counter-rotating beams due to the Sagnac effect and modulation in the IOC causes the beams to interfere, resulting in a combined beam, the intensity and phase of which depends on the angular velocity of the coil.

SUMMARY

In one embodiment, an integrated optical circuit for an interferometer is provided. The integrated optical circuit comprises a first waveguide section of a first material having a first index of refraction, the first material configured to polarize light traveling in the first waveguide section; a second waveguide section diffused with a second material, different from the first material, that is coupled to the first waveguide section at a first interface, the second waveguide section having a second index of refraction; and a third waveguide section of the first material that is coupled to the second waveguide section at a second interface. A portion of the first waveguide section at the first interface is angled at a first angle and a portion of the second waveguide section at the first interface is angled at the first angle. A portion of the first waveguide section at the second interface is angled at a second angle and a portion of the third waveguide section at the second interface is angled at the second angle. The first angle is selected such that the angle of incidence of light exiting the first waveguide section is greater than the Brewster's angle at the first interface. The second angle is selected such that the angle of incidence of light exiting the second waveguide section is greater than the Brewster's angle at the second interface.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
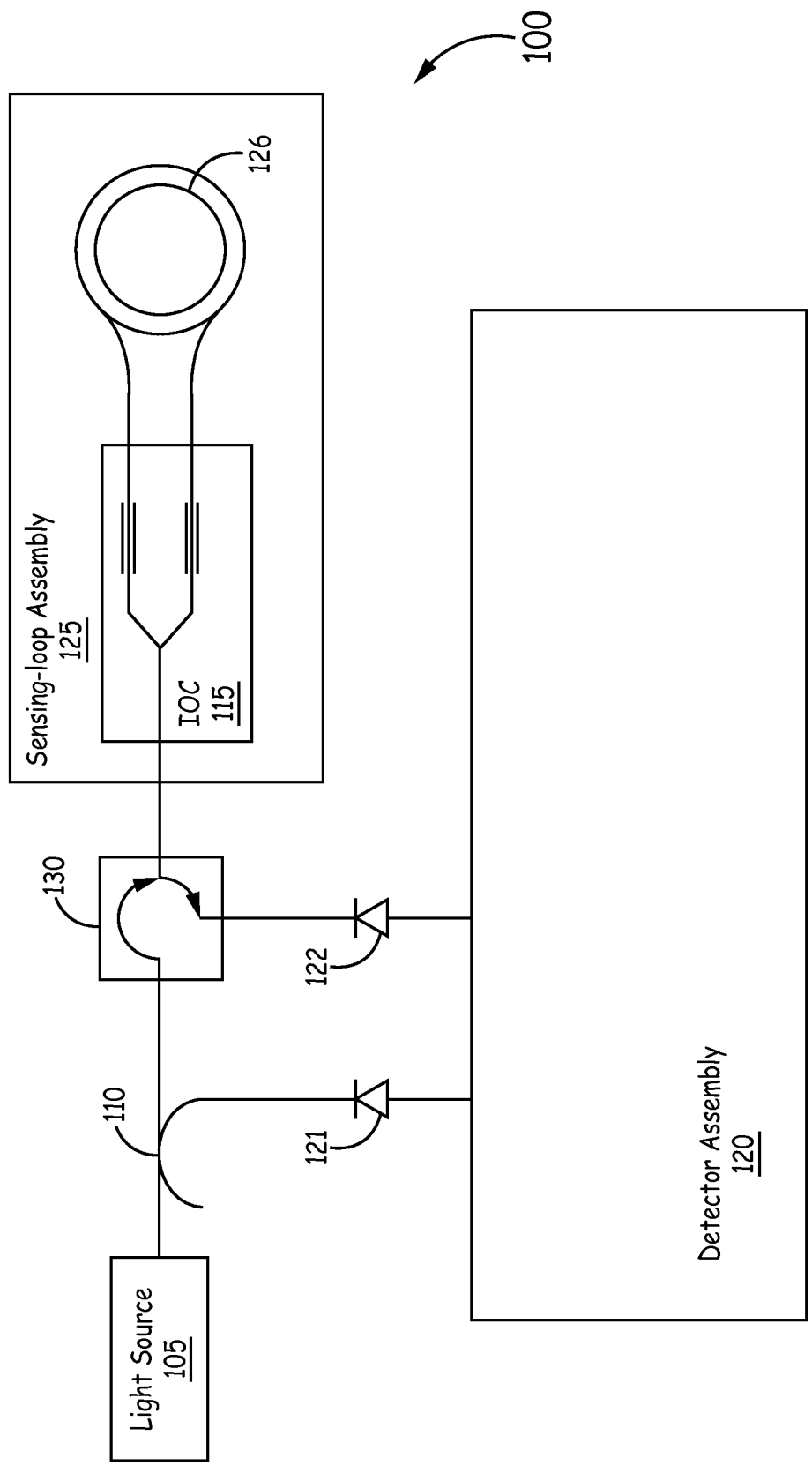
FIG. 1 illustrates one embodiment of an exemplary Interferometer Fiber Optic Gyroscope (IFOG) system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

When testing FOGs using a proton exchanged IOC in a vacuum environment, it has been found that a corruption of the electro-optic modulation occurred and grew with time, eventually rendering the FOG inoperable. The exact phenomenon that corrupts the modulation in FOG output is only partially understood and appears to involve ionic migration along the electric fields near the electrodes of the IOC. However, it is desirable to use a proton exchange process on LiNbO3 to create waveguides so that light of only one polarization is transmitted through the IOC. This increases the precision of the fiber optic gyro rate measurement to a level necessary for the most demanding navigation requirements and can remove the need for an external polarizer in the gyro circuit.

Figure 2:
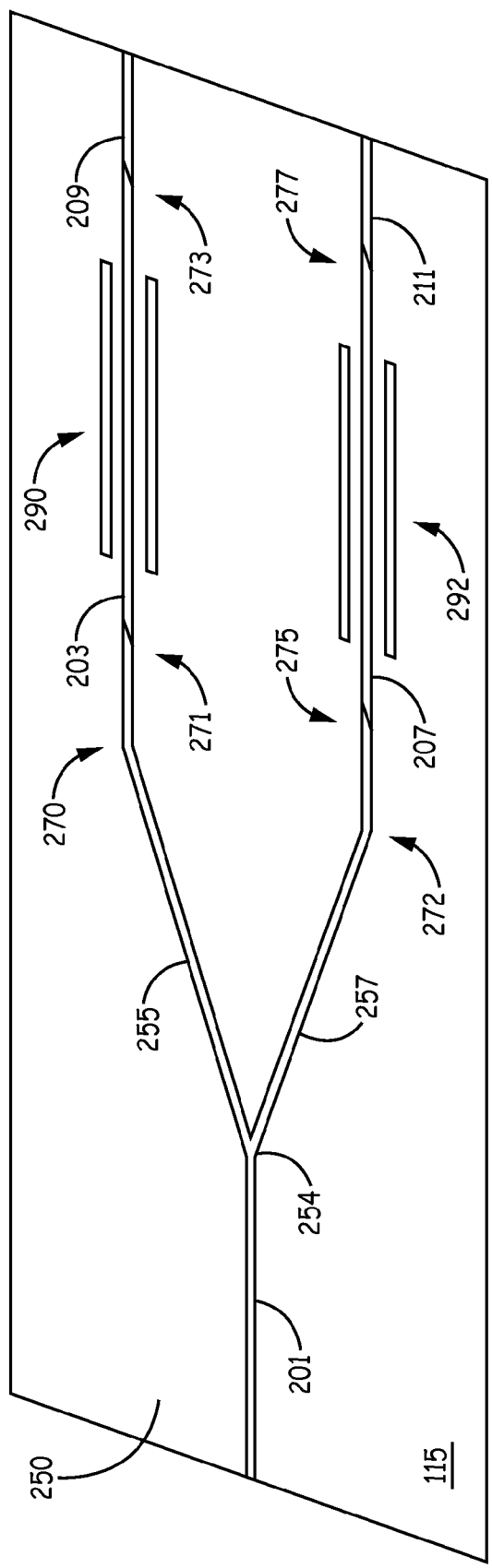
FIG. 2 illustrates one embodiment of an exemplary Integrated Optical Circuit (IOC).

FIG. 1 illustrates one embodiment of an exemplary Interferometer Fiber Optic Gyroscope (IFOG) system 100. IFOG 100 includes a light source 105, a sensing-loop assembly 125 and a detector assembly 120. The light source 105 provides an optical signal or beam to an optional coupler 110, which may function to redirect a portion of the beam to the detector 120. The detector assembly 120 comprises the modulation/demodulation electronics for the gyroscope with which phase modulation is created and the resulting signal is demodulated into rate. The detector assembly 120 also includes photodiodes 121 and 122 which perform the optical detection. The sensing-loop assembly 125 comprises a fiber coil 126 coupled to an integrated optical circuit (IOC) 115. In particular, as shown in FIG. 2, the IOC 115 includes waveguide sections 201, 203, 207, 209, and 211 designed to create a y-junction such that the IOC 115 is coupled to both ends of the fiber coil 126. In addition, in this embodiment, the IOC 115 includes a plurality of Lithium Niobate (LiNBO3) waveguide sections.

As stated above, in one embodiment, an optical coupler 110 redirects a portion of the light from light source 105 to the detector 120. The remainder of the beam may be supplied to the IOC 115 via a circulator element 130 that is, in turn, coupled to the detector 120. In one embodiment, sensing-loop assembly 125 comprises at Sagnac gyroscope. In other embodiments, one or more of optical coupler 110, and circulator element 130 also comprise crystalline LiNbO3 waveguides.

In operation, in one embodiment, a light beam from the light source 105 is provided to integrated optical circuit 115. The light from light source 105 enters a first interferometer waveguide section 201 of integrated optical circuit 115, which filters the light beam into a beam of light linearly polarized along the axis provided by the waveguides crystalline structure. This polarized light beam enters a y-junction 254 from which are formed a first branch section 255 and a second branch section 257 of the waveguide section 201. At the y-junction 254 the light is split into the two beams that will enter the reciprocal paths provided by fiber coil 126. In the embodiment shown in FIG. 2, the y-junction 254 is formed from the first interferometer waveguide section 201. However, it is to be understood that other waveguide sections can be used, in other embodiments, to form the y-junction. For example, in FIG. 3, the y-junction is formed from the second interferometer waveguide section 303.

Before entering fiber coil 126, the two beams are each modulated using a waveform that aids in detecting phase shifts in the interference pattern produced when the two beams are recombined. This modulation is achieved by a set of modulators 290 and 292, which comprise electrodes respectively across waveguide sections 203, 207. Because modulators 290 and 292 modulate the light beam by producing electric fields around waveguide sections 203, 207, these waveguide sections would be susceptible to ion-migration under non-atmospheric conditions if proton-exchange waveguides were used. Accordingly, instead of using proton-exchange waveguides, Titanium-diffused waveguides are selected for these regions based on making these sections of the waveguide not susceptible to ionic migration in non-atmospheric conditions. The Titanium-diffused waveguide sections are coupled on either side to a proton-exchange waveguide section. Thus, the benefit of utilizing proton-exchange waveguides is achieved while limiting effects of electrical fields by utilizing Titanium-diffused waveguides in regions subject to the electrical fields produced by the modulators 290 and 292.

For example, Titanium-diffused section 203 is coupled to the proton-exchange waveguide section 201 at an interface 271 and to the proton-exchange waveguide section 209 at an interface 273. Similarly, the Titanium-diffused section 207 is coupled to the proton-exchange waveguide section 201 at an interface 275 and to the proton-exchange waveguide section 211 at an interface 277. In particular, a portion of each waveguide section is angled at the respective interface. For example, at interface 271, a portion of waveguide section 201 and a portion of waveguide section 203 are angled, as shown, for example, in the top view of an exemplary interface 471 in FIG. 4. As shown in FIG. 2, the angle of the portion of waveguide section 201 is approximately the same as the angle of the portion of waveguide section 203. In this way, the two angled waveguide portions align to be stitched or coupled together.

The angle for each of the portions at the interface 271 is selected such that an angle of incidence of light exiting the waveguide section 201 and entering the waveguide section 203 is greater than a Brewster's angle at the interface 271. The Brewster's angle (also referred to as the polarization angle) at an interface is an angle of incidence at which P polarized light is transmitted through the interface without reflection. The Brewster's angle is dependent on the respective index of refraction of each of the waveguide sections at the interface. In particular, the Brewster's angle ($\theta_B$) can be defined by equation 1 wherein n1 is the index of refraction of the waveguide section the light is exiting and n2 is the index of refraction of the waveguide section the light is entering.

$$\theta_B = \arctan\left(\frac{n_2}{n_1}\right) \quad \text{Eq. 1}$$

Figure 3:
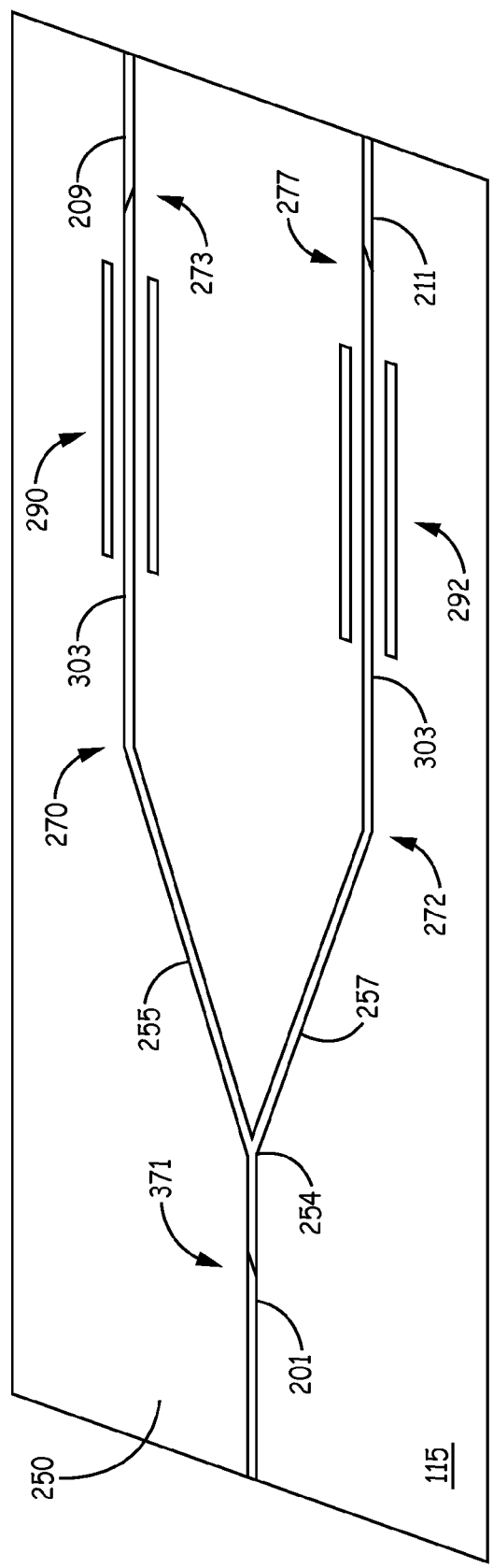
FIG. 3 illustrates another embodiment of an exemplary IOC.

The respective portions of the waveguide sections at each of the interfaces 273, 275, and 277 are similarly angled such that the angle of incidence is greater than the polarization angle at the respective interface. By selecting the angle to be greater than the Brewster's or polarization angle, light is not trapped in the waveguide sections. In addition, by using an angled portion at the interfaces, coherent back reflection of the light is avoided. In some embodiments, such as shown in FIG. 3, the angle of the waveguide section 303 at interface 273 and the angle of the waveguide section 303 at interface 277 are supplementary. That is, the respective angles of the waveguide section 303 at interfaces 273 and 277 add to 180°. The benefit of using supplementary angles at interfaces 273 and 277 is to avoid recoupling light from one branch section into the other branch section, Coherent back reflected light is light that is coherent with the light traveling from the fiber coil 126 to the detector 120. In particular, the two beams of light exiting from fiber coil 126 are recombined in IOC 115, producing an interferogram that indicates the rotational rate of the gyroscope. The combined beam is provided to detector assembly 120 via photodiode 122 which deciphers these rates from the returning beam. Coherent back reflected light can interfere with the recombined signal and thereby cause errors in the detected rotation rate. Thus, the angled portions of the waveguides at the respective interfaces reduces or eliminates the coherent back reflected light at the interfaces between the waveguide sections. In addition, the interfaces between waveguide sections are located at points where the electrical fields generated by the modulators 290 and 292 are approximately zero. As such, stitching of proton-exchanged to Titanium-diffused waveguides occurs far enough from the modulators 290 and 292 such that the proton-exchanged waveguides sections 201, 209, and 211 are unaffected by ion migration due to electric fields associated with modulation.

Alignment of proton-exchanged to Titanium-diffused waveguides is aided when stitching of these regions occurs in regions of the substrate 250 where the crystal planes of the LiNbO3 are parallel to the direction of the waveguides. This serves to preserve the polarization provided by the proton-exchanged regions and avoids introduction of related errors in the rotational rate determination due to corruption of the interferogram. As such, in one embodiment, the stitching is located a distance away from the bent regions (such as at 270 and 272) sufficient to avoid modal transition effects that may occur at the bent regions in addition to being located where expected electric fields are negligible. In one embodiment, the respective interfaces 271 and 275 are approximately halfway between the modulators 290 and 292 and the bent regions 270 and 272.

Figure 4:
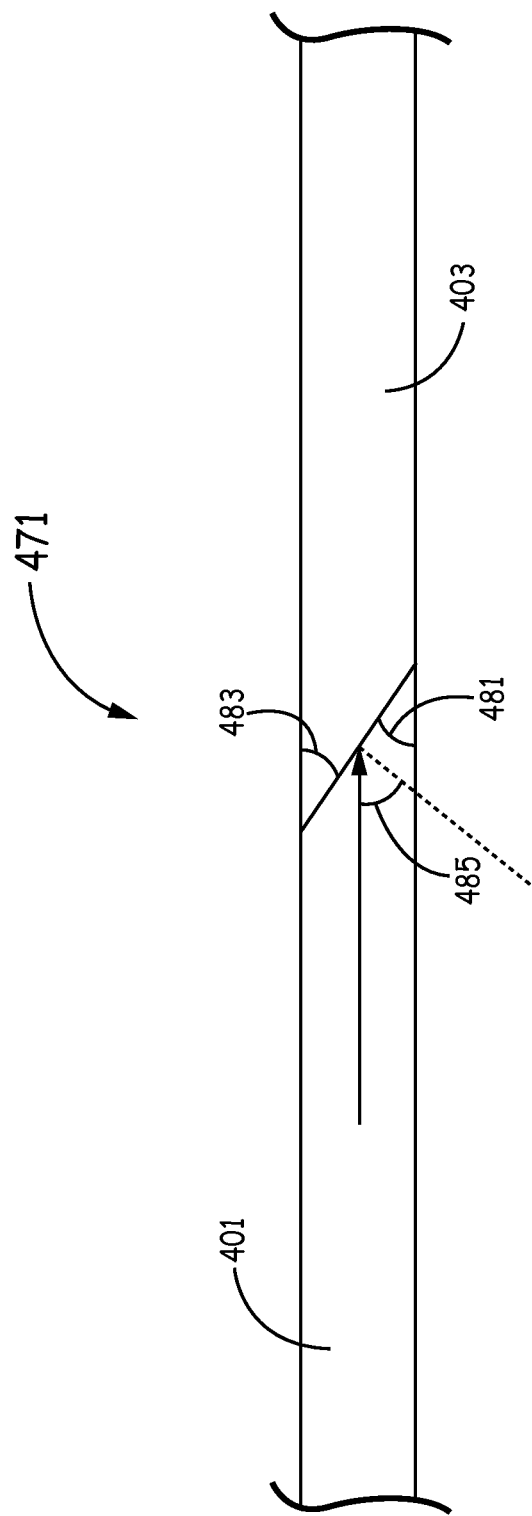
FIG. 4 illustrates one embodiment of an exemplary interface in an IOC.

FIG. 4 depicts a top view of an enlarged section of an exemplary angled interface 471 used in an IOC such as IOC 115 in FIG. 2 or 3. Although FIG. 4 is discussed with respect to exemplary angled interface 471, it is to be understood that the features shown in FIG. 4 can be applied to any of the angled interfaces shown in FIGS. 2 and 3. As can be seen in FIG. 4, a portion of the waveguide section 401 is angled at an angle 481. In particular, the width of the waveguide section 401 gradually decreases in this example to form the angled portion. The angle 481 is selected such that an angle of incidence 485 for light exiting the waveguide section 481 is greater than a Brewster's angle, as discussed above. A portion of the waveguide section 403 is also angled at the interface 471. The angle 483 of the angled portion of waveguide section 403 is approximately the same as the angle 481, in this embodiment, such that the waveguide section 403 and waveguide section 401 align at the interface 471. In this top view, it can be seen that waveguide sections 401 and 403 are located next to each other rather than one over top of the other with respect to a substrate, such as substrate 250, on which the waveguide sections are formed.

Figure 5:
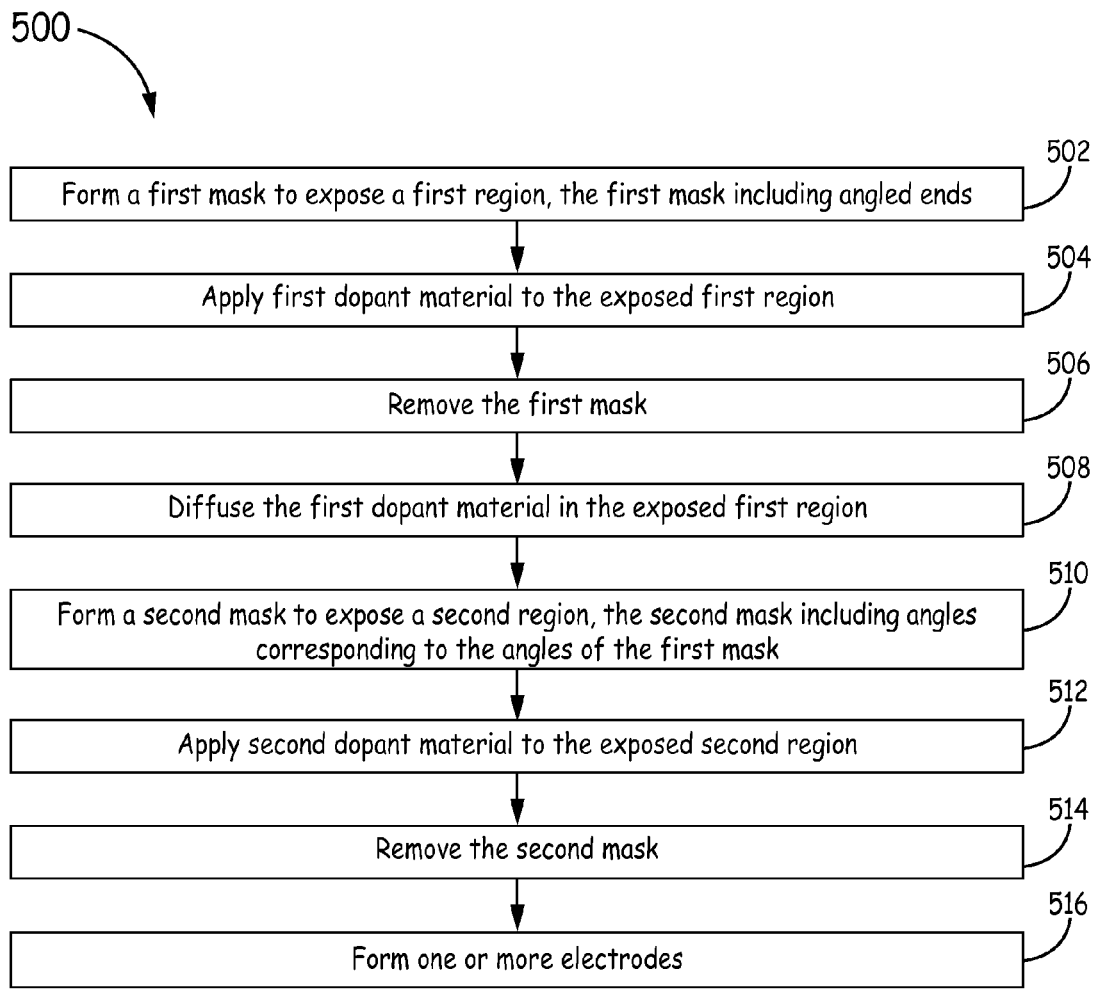
FIG. 5 is a flow chart depicting one embodiment of an exemplary method for producing an integrated optical circuit for an interferometer.

FIG. 5 is a flow chart depicting a method 500 for producing an integrated optical circuit for an interferometer. At block 502, a first mask is formed to expose a first region using techniques known to one of skill in the art. In some embodiments, the first region comprises two separate parallel sections. In other embodiments, the first region comprises two parallel sections which join together to form a y-junction, as discussed above. In addition, the first mask is configured to form an angle at each end of the first region. Thus, in embodiments having two separate parallel sections, an angle is formed at each end of each section. In embodiments having two parallel sections which join to form a y-junction, an angle is formed at a point after the y-junction and at an end of each of the parallel sections. Furthermore, in some embodiments, the angles formed at corresponding ends of the parallel sections are supplementary, as discussed above.

At block 504, titanium (Ti) is applied to the exposed first region. At block 506, the first mask is removed using technique known to one of skill in the art. At block 508, the titanium is diffused, such as through a high temperature (e.g. approximately 1020° C.) process known to one of skill in the art, to form Ti-diffused waveguides. At block 510, a second mask is formed to expose a second region. The second mask is formed such that the second region includes respective sections which abut the ends of the sections of the first region. In particular, the ends of the respective sections of the second region include angles which correspond with the respective ends of the first region. The angles of the first region and the second region are selected such that an angle of incidence of light at an interface between the Ti-diffused waveguides and the proton-exchange waveguides is greater than a Brewster's angle.

At block 512, an annealed proton exchange is performed to form proton-exchanged waveguides from the second region using techniques known to one of skill in the art. For example, the masked wafer can be soaked in an acid at approximately 300-400° C. to perform the annealed proton exchange. The proton-exchange material is configured to polarize light traveling in the proton-exchanged waveguides. At block 514, the second mask is removed using techniques known to one of skill in the art. At block 516, one or more electrodes are formed. The electrodes can be formed using one of multiple different processes known to one of skill in the art. For example, the electrodes can be formed using metal deposition, electroplating, etc. The electrodes form the at least one modulator discussed above. The at least one modulator is configured to generate an electric field in a portion of the titanium-diffused waveguides. In some embodiments, the interfaces between the Ti-diffused waveguides and the proton-exchange waveguides are formed at a distance from the electrodes where the electrical field produced by the at least one modulator is negligible.

Although specific embodiments have been illustrated and described herein, it will be appreciated by those of ordinary skill in the art that any arrangement, which is calculated to achieve the same purpose, may be substituted for the specific embodiments shown. For example, although the embodiments above discuss using Lithium Niobate as the substrate material, it is to be understood that other materials can be used in other embodiments, such as, but not limited to, Lithium tantalite. Similarly, although Titanium and Protons are discussed above for forming waveguides, it is to be understood that waveguides can be patterned using other dopants in other embodiments, such as, but not limited to Tungsten, Molybdenum, Manganese, etc. Therefore, it is manifestly intended that this invention be limited only by the claims and the equivalents thereof.

Example Embodiments

Example 1 includes an integrated optical circuit for an interferometer, the integrated optical circuit comprising: a first waveguide section of a first material having a first index of refraction, the first material configured to polarize light traveling in the first waveguide section; a second waveguide section diffused with a second material, different from the first material, that is coupled to the first waveguide section at a first interface, the second waveguide section having a second index of refraction; and a third waveguide section of the first material that is coupled to the second waveguide section at a second interface; wherein a portion of the first waveguide section at the first interface is angled at a first angle and a portion of the second waveguide section at the first interface is angled at the first angle; wherein a portion of the first waveguide section at the second interface is angled at a second angle and a portion of the third waveguide section at the second interface is angled at the second angle; wherein the first angle is selected such that the angle of incidence of light exiting the first waveguide section is greater than the Brewster's angle at the first interface; and wherein the second angle is selected such that the angle of incidence of light exiting the second waveguide section is greater than the Brewster's angle at the second interface.

Example 2 includes the integrated optical circuit of Example 1, wherein the second waveguide section is a Titanium-diffused waveguide, the second waveguide section exposed to an electrical field; and wherein each of the first and third waveguide sections is an annealed proton-exchange waveguide, the first and third waveguide sections not exposed to the electrical field.

Example 3 includes the integrated optical circuit of any of Examples 1-2, wherein the width of the first waveguide section and the width of the second waveguide section decrease at the first interface to form the respective angled portions of the first and second waveguide sections.

Example 4 includes the integrated optical circuit of any of Examples 1-3, wherein the first waveguide section includes a junction from which first and second branch sections of the first waveguide section are formed, the second waveguide section coupled to the first branch section at the first interface, the integrated optical circuit further comprising: a fourth waveguide section diffused with the second material and coupled to the second branch section at a third interface; and a fifth waveguide section of the first material and coupled to the fourth waveguide section at a fourth interface; wherein a portion of the fourth waveguide section at the third interface is angled at a third angle and a portion of the second branch section at the third interface is angled at the third angle; wherein a portion of the fourth waveguide section at the fourth interface is angled at a fourth angle and a portion of the fifth waveguide section at the fourth interface is angled at the fourth angle; wherein the third angle is selected such that the angle of incidence of light exiting the second branch section is greater than the Brewster's angle at the third interface; and wherein the fourth angle is selected such that the angle of incidence of light exiting the fourth waveguide section is greater than the Brewster's angle at the fourth interface.

Example 5 includes the integrated optical circuit of any of Examples 1-3, wherein the second waveguide section includes a junction from which first and second branch sections of the second waveguide section are formed, the third waveguide section coupled to the first branch section at the second interface, the integrated optical circuit further comprising: a fourth waveguide section of the first material and coupled to the second branch section at a third interface; wherein a portion of the second branch section at the third interface and a portion of the fourth waveguide section at the third interface are angled at a third angle; wherein the third angle is selected such that the angle of incidence of light exiting the second branch section is greater than the Brewster's angle at the third interface.

Example 6 includes the integrated optical circuit of Example 5, wherein the second angle and the third angle are supplementary angles.

Example 7 includes the integrated optical circuit of any of Examples 1-6, further comprising at least one modulator coupled to the second waveguide section, the at least one modulator providing modulating voltages generating an electrical field; and wherein the first interface and the second interface are located at a distance from the at least one modulator where the electrical field produced by the at least one modulator is negligible.

Example 8 includes a method for producing an integrated optical circuit for an interferometer, the method comprising: forming a first mask to expose a first region of a wafer, wherein the first mask is configured to form a respective angle at each end of the first region; applying a first dopant material to the exposed first region; removing the first mask; diffusing the first dopant material applied to the exposed first region; forming a second mask to expose a second region of the wafer, wherein the second mask is formed such that the second region includes respective sections each having a respective angle which abuts one of the angled ends of the first region, each angle of the respective sections of the second region formed to correspond with the respective angle of the respective end of the first region and selected such that an angle of incidence of light at an interface between the first region and the second region is greater than a Brewster's angle; applying a second dopant material to the exposed second region; removing the second mask; and forming one or more electrodes near the first region.

Example 9. The method of Example 8, wherein forming the first mask to expose the first region comprises forming the first mask to form the first region having two separate parallel sections.

Example 10 includes the method of Example 8, wherein forming the first mask to expose the first region comprises forming the first mask to form the first region having two parallel sections which join together to form a y-junction.

Example 11 includes the method of Example 10, wherein each of the parallel sections is formed to have a respective angle at a first end, the respective angles formed at the respective first ends of the parallel sections of the first region being supplementary angles.

Example 12 includes the method of any of Examples 8-11, wherein the one or more electrodes form at least one modulator configured to generate an electric field in a portion of the first region; wherein the angled ends where the first region and the second region meet are formed at a distance from the electrodes where the electrical field produced by the at least one modulator is negligible.

Example 13 includes an interferometer fiber optic gyroscope comprising: a light source; a detector coupled to the light source; a rate-sensing fiber-optic coil coupled to the detector; and an integrated optical circuit coupled to the coil, the circuit comprising: a first waveguide section of a first material having a first index of refraction, the first material configured to polarize light traveling in the first waveguide section; a second waveguide section diffused with a second material, different from the first material, that is coupled to the first waveguide section at a first interface, the second waveguide section having a second index of refraction; at least one modulator coupled to the second waveguide section, the at least one modulator providing modulating voltages generating the electrical field; and a third waveguide section of the first material that is coupled to the second waveguide section at a second interface; wherein a portion of the first waveguide section at the first interface is angled at a first angle and a portion of the second waveguide section at the first interface is angled at the first angle; wherein a portion of the first waveguide section at the second interface is angled at a second angle and a portion of the third waveguide section at the second interface is angled at the second angle; wherein the first angle is selected such that the angle of incidence of light exiting the first waveguide section is greater than the Brewster's angle at the first interface; and wherein the second angle is selected such that the angle of incidence of light exiting the second waveguide section is greater than the Brewster's angle at the second interface.

Example 14 includes the interferometer fiber optic gyroscope of Example 13, wherein the second waveguide section is a Titanium-diffused waveguide; and wherein each of the first and third waveguide sections is an annealed proton-exchange waveguide.

Example 15 includes the interferometer fiber optic gyroscope of Example 14, wherein the second waveguide section is exposed to an electrical field and the first and third waveguide sections not exposed to the electrical field Example 16 includes the interferometer fiber optic gyroscope of any of Examples 13-15, wherein the width of the first waveguide section and the width of the second waveguide section decrease at the first interface to form the respective angled portions of the first and second waveguide sections.

Example 17 includes the interferometer fiber optic gyroscope of any of Examples 13-16, wherein the first waveguide section includes a junction from which first and second branch sections of the first waveguide section are formed, the second waveguide section coupled to the first branch section at the first interface, the integrated optical circuit further comprising: a fourth waveguide section diffused with the second material and coupled to the second branch section at a third interface; and a fifth waveguide section of the first material and coupled to the fourth waveguide section at a fourth interface; wherein a portion of the fourth waveguide section at the third interface is angled at a third angle and a portion of the second branch section at the third interface is angled at the third angle; wherein a portion of the fourth waveguide section at the fourth interface is angled at a fourth angle and a portion of the fifth waveguide section at the fourth interface is angled at the fourth angle; wherein the third angle is selected such that the angle of incidence of light exiting the second branch section is greater than the Brewster's angle at the third interface; and wherein the fourth angle is selected such that the angle of incidence of light exiting the fourth waveguide section is greater than the Brewster's angle at the fourth interface.

Example 18 includes the interferometer fiber optic gyroscope of any of Examples 13-16, wherein the second waveguide section includes a junction from which first and second branch sections of the second waveguide section are formed, the third waveguide section coupled to the first branch section at the second interface, the integrated optical circuit further comprising: a fourth waveguide section of the first material and coupled to the second branch section at a third interface; wherein a portion of the second branch section at the third interface and a portion of the fourth waveguide section at the third interface are angled at a third angle; wherein the third angle is selected such that the angle of incidence of light exiting the second branch section is greater than the Brewster's angle at the third interface.

Example 19 includes the interferometer fiber optic gyroscope of Example 18, wherein the second angle and the third angle are supplementary angles.

Example 20 includes the interferometer fiber optic gyroscope of any of Examples 13-19, further comprising at least one modulator coupled to the second waveguide section, the at least one modulator providing modulating voltages generating an electrical field; wherein the first interface and the second interface are located at a distance from the at least one modulator where the electrical field produced by the at least one modulator is negligible.

What is claimed is:

1. An integrated optical circuit for an interferometer, the integrated optical circuit comprising:
   a first waveguide section of a first material having a first index of refraction, the first material configured to polarize light traveling in the first waveguide section;
   a second waveguide section diffused with a second material, different from the first material, that is coupled to the first waveguide section at a first interface, the second waveguide section having a second index of refraction; and
   a third waveguide section of the first material that is coupled to the second waveguide section at a second interface;
   wherein a portion of the first waveguide section at the first interface is angled at a first angle and a portion of the second waveguide section at the first interface is angled at the first angle;
   wherein a portion of the second waveguide section at the second interface is angled at a second angle and a portion of the third waveguide section at the second interface is angled at the second angle;
   wherein the first angle is selected such that the angle of incidence of light exiting the first waveguide section is greater than the Brewster's angle at the first interface; and
   wherein the second angle is selected such that the angle of incidence of light exiting the second waveguide section is greater than the Brewster's angle at the second interface;
   wherein the second waveguide section includes a junction from which first and second branch sections of the second waveguide section are formed, the third waveguide section coupled to the first branch section at the second interface, the integrated optical circuit further comprising:
   a fourth waveguide section of the first material coupled to the second branch section at a third interface;
   wherein a portion of the second branch section at the third interface and a portion of the fourth waveguide section at the third interface are angled at a third angle;
   wherein the third angle is selected such that the angle of incidence of light exiting the second branch section is greater than the Brewster's angle at the third interface;
   wherein the second angle and the third angle are supplementary angles.

2. The integrated optical circuit of claim 1, further comprising a modulator positioned to produce an electric field across the second waveguide section, wherein the second waveguide section is a Titanium-diffused waveguide
   wherein each of the first and third waveguide sections is an annealed proton-exchange waveguide, the first and third waveguide sections not exposed to the electrical field; and
   wherein the first interface and second interface are positioned a distance from the modulator so that the first and third waveguide sections are not exposed to the electrical field produced by the modulator.

3. The integrated optical circuit of claim 1, wherein the width of the first waveguide section and the width of the second waveguide section decrease at the first interface to form the respective angled portions of the first and second waveguide sections.

4. The integrated optical circuit of claim 1, further comprising at least one modulator coupled to the second waveguide section, the at least one modulator providing modulating voltages generating an electrical field; and
   wherein the first interface and the second interface are located at a distance from the at least one modulator where the electrical field produced by the at least one modulator is negligible.

5. An interferometer fiber optic gyroscope comprising:
   a light source;
   a detector coupled to the light source;
   a rate-sensing fiber-optic coil coupled to the detector; and
   an integrated optical circuit coupled to the coil, the circuit comprising:
      a first waveguide section of a first material having a first index of refraction, the first material configured to polarize light traveling in the first waveguide section;
      a second waveguide section diffused with a second material, different from the first material, that is coupled to the first waveguide section at a first interface, the second waveguide section having a second index of refraction;
      at least one modulator coupled to the second waveguide section, the at least one modulator providing modulating voltages generating the electrical field; and
      a third waveguide section of the first material that is coupled to the second waveguide section at a second interface;
      wherein a portion of the first waveguide section at the first interface is angled at a first angle and a portion of the second waveguide section at the first interface is angled at the first angle;
      wherein a portion of the first waveguide section at the second interface is angled at a second angle and a portion of the third waveguide section at the second interface is angled at the second angle;
      wherein the first angle is selected such that the angle of incidence of light exiting the first waveguide section is greater than the Brewster's angle at the first interface; and wherein the second angle is selected such that the angle of incidence of light exiting the second waveguide section is greater than the Brewster's angle at the second interface;

wherein the second waveguide section includes a junction from which first and second branch sections of the second waveguide section are formed, the third waveguide section coupled to the first branch section at the second interface, the integrated optical circuit further comprising:

a fourth waveguide section of the first material coupled to the second branch section at a third interface;

wherein a portion of the second branch section at the third interface and a portion of the fourth waveguide section at the third interface are angled at a third angle;

wherein the third angle is selected such that the angle of incidence of light exiting the second branch section is greater than the Brewster's angle at the third interface; and wherein the second angle and the third angle are supplementary angles.

6. The interferometer fiber optic gyroscope of claim 5, wherein the second waveguide section is a Titanium-diffused waveguide; and wherein each of the first and third waveguide sections is an annealed proton-exchange waveguide.

7. The interferometer fiber optic gyroscope of claim 6, wherein the second waveguide section is exposed to an electrical field and the first and third waveguide sections not exposed to the electrical field.

8. The interferometer fiber optic gyroscope of claim 5, wherein the width of the first waveguide section and the width of the second waveguide section decrease at the first interface to form the respective angled portions of the first and second waveguide sections.

9. The interferometer fiber optic gyroscope of claim 5, further comprising at least one modulator coupled to the second waveguide section, the at least one modulator providing modulating voltages generating an electrical field;

wherein the first interface and the second interface are located at a distance from the at least one modulator where the electrical field produced by the at least one modulator is negligible.

* * * * *